F. M. POWELL.
HAYSTACKER.
APPLICATION FILED MAR. 24, 1919.

1,330,745.

Patented Feb. 10, 1920.
2 SHEETS—SHEET 1.

Inventor
FRANCIS M. POWELL

By Reynolds & Cook
Attorneys

F. M. POWELL.
HAYSTACKER.
APPLICATION FILED MAR. 24, 1919.
1,330,745.
Patented Feb. 10, 1920.
2 SHEETS—SHEET 2.
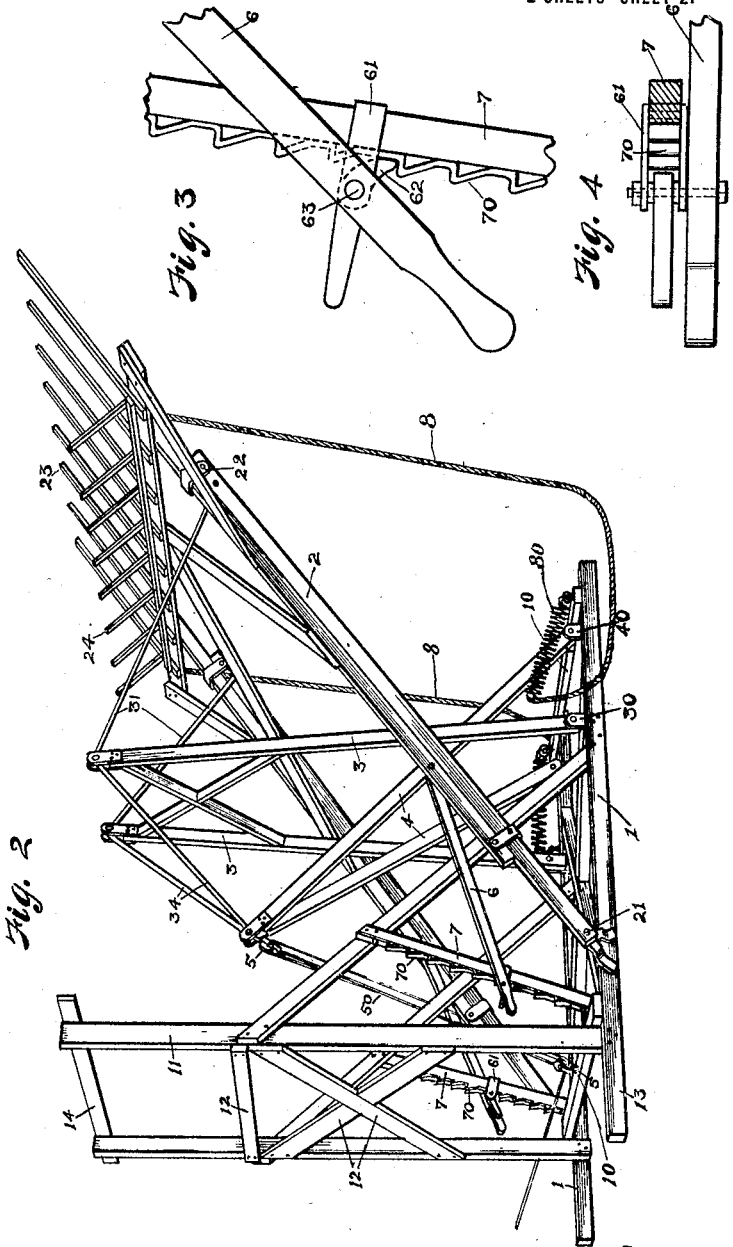
Inventor
FRANCIS M. POWELL
By Reynolds & Cook
Attorneys

UNITED STATES PATENT OFFICE.

FRANCIS M. POWELL, OF TACOMA, WASHINGTON.

HAYSTACKER.

1,330,745.     Specification of Letters Patent.      Patented Feb. 10, 1920.

Application filed March 24, 1919. Serial No. 284,761.

*To all whom it may concern:*

Be it known that I, FRANCIS M. POWELL, a citizen of the United States, and resident of the city of Tacoma, county of Pierce, and State of Washington, have invented certain new and useful Improvements in Haystackers, of which the following is a specification.

My invention relates to hay stackers, or devices for the raising of hay or similar loose and bulky products so as to pile it in stacks.

The object of my invention is to provide a device for this purpose of an improved construction. The features of this device which I believe to be new and upon which I desire patent protection will first be described, and then particularly defined by the claim.

In the accompanying drawings I have shown a hay stacker in which my invention has been incorporated, the same illustrating the principles of my invention and the particular embodiment thereof which I now prefer to use.

Fig. 2 shows the device in perspective in a partly raised position, illustrating modifications in construction of certain parts.

Figs. 3 and 4 are respectively side view and plan of the adjustable pivot support for the links which operate the sliding portion of the lifter frame.

Figure 1:
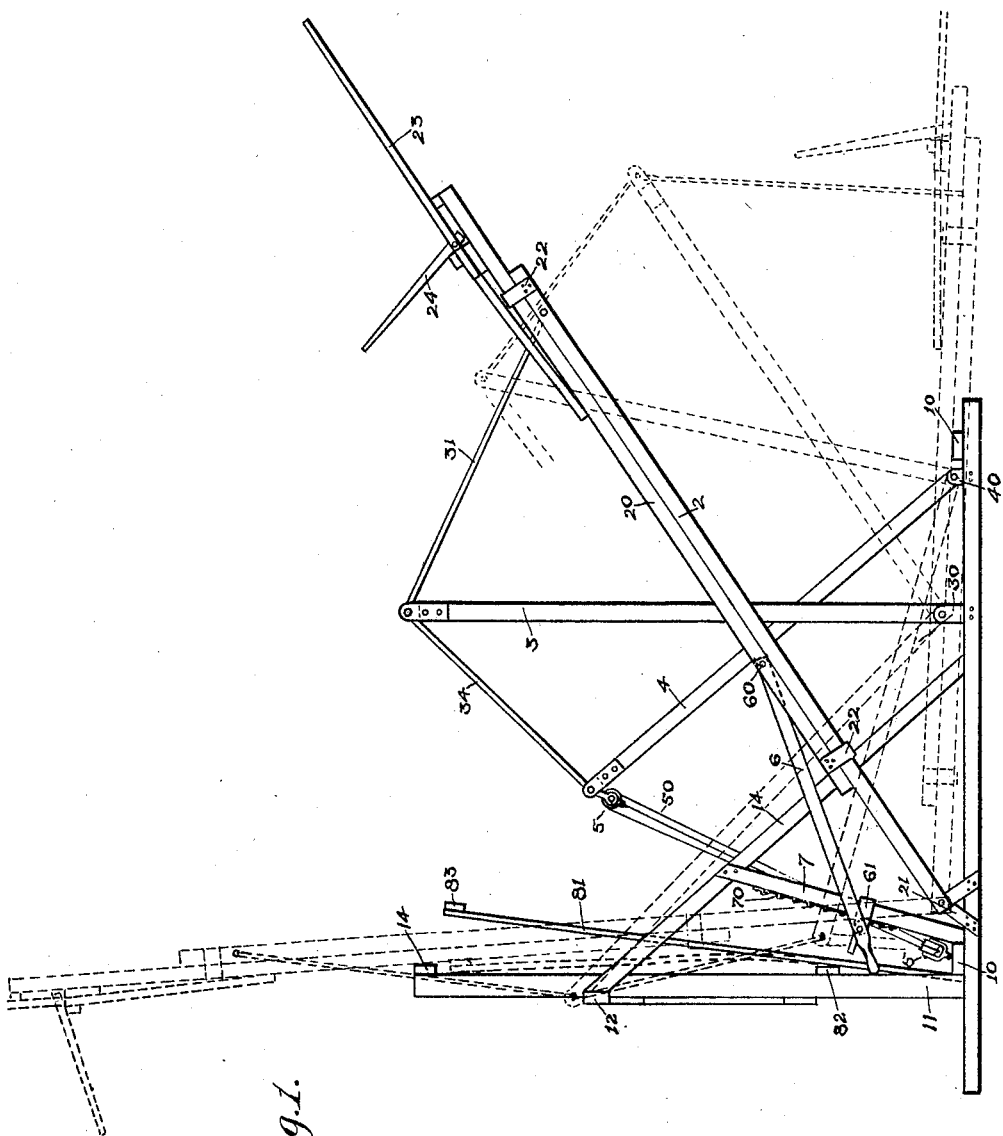
Figure 1 is a side view of my hay stacker, the parts being shown in full lines in a position intermediate between the lowered and fully raised position and by dotted lines in lowered and raised positions.

The particular type of hay stacker to which my invention has been applied, employs a large base frame which rests upon the ground, and a lifting frame, which is pivoted by one end upon one end of the base and at its other end is provided with hay carrying means, and the hay is raised and deposited upon the stack by swinging this frame upwardly to a vertical position.

The base frame, as illustrated, has long beams 1 forming the sides thereof, these being connected by transverse connecting beams and braces 10, these latter being disposed and secured in any design desired or required by practical considerations. Such base frame is also usually provided with uprights or posts 11, which are close to the sides of the stack, these being also connected and braced by beams 12, disposed as desired or necessary. The ground beams 1 at the inner end of the base, that is, at the end which is toward the stack, project beyond the uprights 11, as shown at 13, so that the stack is built upon these. In this way the base is held down against any tendency to tip over when starting up with a load of hay. These beams 1 serve as runners when moving from one place to another.

The lifting frame employs two sets of side bars 2 and 20, which lie alongside each other and are held together in a manner to permit relative movement between them in the direction of their length. As herein illustrated these are held in sliding contact by stirrups 22, which are secured to one bar and embrace the other.

The bars 2 are pivoted by their inner ends upon the base frame near the inner end thereof, as at 21. The other or sliding bars 20 of the lifting frame, at their outer ends, are provided with hay carrying means, as the fingers 23, which, when the lifting frame is down, rest upon the ground. Discharging fingers 24 extend upwardly, or inwardly, and prevent discharge of the hay until the lifting frame is substantially vertical.

To swing this lifting frame upward, I employ two pairs of booms, 3 and 4. The lower ends of these booms are pivoted to the base frame 1 at 30 and 40, respectively. These booms are inclined in opposite directions, the boom 3, which is pivoted nearest to the inner end of the base, or nearest to the stack, has its upper end farthest from the stack, while the boom 4, which is pivoted farthest from the stack, has its upper or swinging end extending nearest to the stack. These booms are thus placed so that they cross each other.

The upper ends of booms 3 and 4 are connected by links or rods 34, and the upper ends of booms 3 are connected with the lifting frame, by links or rods 31. This latter connection is preferable with the bars 2, which form the non-sliding part of the lifting frame. The booms 3 and 4 are swung upon their pivots through means connected with the boom 4, as by the blocks 5 and the rope 50, one of the blocks being connected with the swinging end of the boom 4 and the other with the base 1. This rope may then be led out to one side and operated by a team or by any other suitable means. Where the power employed is of sufficient strength, the blocks 5 may be dispensed with, except as they may be required as guides for the rope.

The sliding member 20 of the lifting frame is actuated and controlled by links 6, which are pivoted to the bars 20 at 60, which point is well toward their inner ends. Means are provided for pivoting the rear or inner ends of these links at various points, which are located above the points 21, about which the lifting frame swings. The adjustment vertically of the point of pivoting of this inner end of link 6, will control, to a certain extent, the height to which the hay is lifted.

If the two side bars 2 and 20 were fixed together, the path of the carrier 23 will be an arc of a circle. If, however, by any means the bar 20 be slid outward upon the bar 2 while swinging upward, the carrier 23 will be raised higher than the radius upon which the swing first started; further, if the pivot support for the inner end of the link 6 be above the pivot point 21 for the lifting frame, the increased height to which the carrier is raised will be greater than when this inner pivot for the link 6 is inwardly from, but at substantially the same level as the pivot 21. By making the pivot 63 adjustable this action may be controlled within certain limits.

The manner in which this result may be secured, as illustrated is as follows: A bar 7 is supported from the frame 21. It is provided on one edge with a series of hooks or other means for engaging and supporting a pin. I have shown for this purpose a bar 70, having a toothed edge. A stirrup or clevis 61 spans the beam 7 and has a catch or dog 62, pivoted therein at 63, and the link 6 is pivoted upon the same pin. By this or by any other suitable means the pivotal supports for the links 6 may be easily and quickly adjusted vertically. The extended upward movement given to the hay carrier by this means will correspond with the amount the pivot 63, is raised above the pivot 21.

This added extension of the hay carrier occurs largely after the carrier has been raised well above the ground, at a point where the angle of swing is such as to reduce the power required to keep the load under way. In consequence this requires no increase in the operating power.

To serve as a stop for the lifting frame a plank 14 which connects the upper ends of the uprights 11 extends outward beyond these uprights and serves to stop the lifting frame. To insure a prompt return of the lifting frame after it has been raised, I may attach a rope 8 thereto and, as shown in Fig. 2, at any convenient point in this, insert a recoil spring 80, the length of this being regulated so that the spring is stretched when the frame reaches its uppermost position. The pull of the spring will act to overbalance the lifting frame and start it down. By controlling the application of the power which swings the lifting frame so as to stop this just before it passes over the balanced position, the momentum will carry it beyond and the spring, or other coil member, will promptly return the lifting frame.

In Fig. 1 a construction is shown in which two vertical planks 81 are so used as to form a recoil buffer and returning spring. The lower ends of these planks are placed back of the cross bar 10 of the base and forward of a cross plank 82 which is secured to the uprights 11. A cross plank 83 connects the upper ends of the vertical planks 81 and is of such length that it will be engaged by the lifting frame as the latter nears the vertical balancing position. The vertical planks 81 being supported near one end and being placed so that the strain comes flat-wise thereon from a cheap and effective recoil spring.

It is believed the principles of this device have been stated with sufficient fullness as to not require any further detailed statement.

What I claim as my invention is:

In a hay stacker, a base frame, an extendible lifting frame comprising spaced beams pivotally fixed at their inner ends on the base frame adjacent one end thereof and extending when lowered, beyond its opposite end, means for adjusting said extensible lifting frame and for reinforcing its pivotal mounting, a hay carrier mounted on the free ends of the lifting beams, a boom comprising spaced side beams pivotally fixed at their lower ends to the base beams intermediate their ends, a second boom pivotally mounted on the base beams forwardly the first boom and operating between the carrier frame and first boom, link connections between the free ends of the two booms and first boom and carrier frame, means for actuating the last named boom to move the lifting beams from loading to discharging position, whereby the carrier is moved in an arc through and beyond the vertical plane of the carrier frame mountings, a stop frame erected on the base comprising vertical posts and a connecting cross bar engageable by the lifting beams when they have passed slightly beyond their vertical position, and a yieldable member for urging the lifting frame back over a vertical position after a load has been discharged from the carrier.

Signed at Tacoma, Washington, this 17th day of March, 1919.

FRANCIS M. POWELL.